Aug. 31, 1954   H. E. BARRETT ET AL   2,687,868
FLOW CONTROL VALVE
Filed May 31, 1950
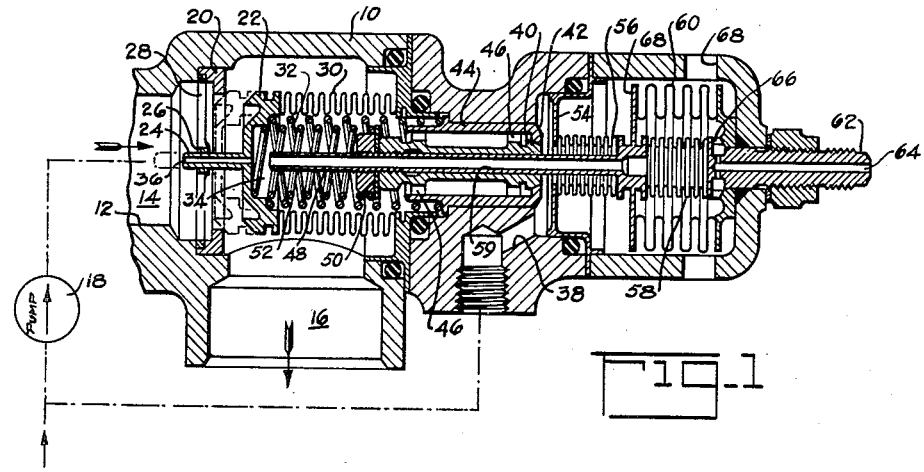
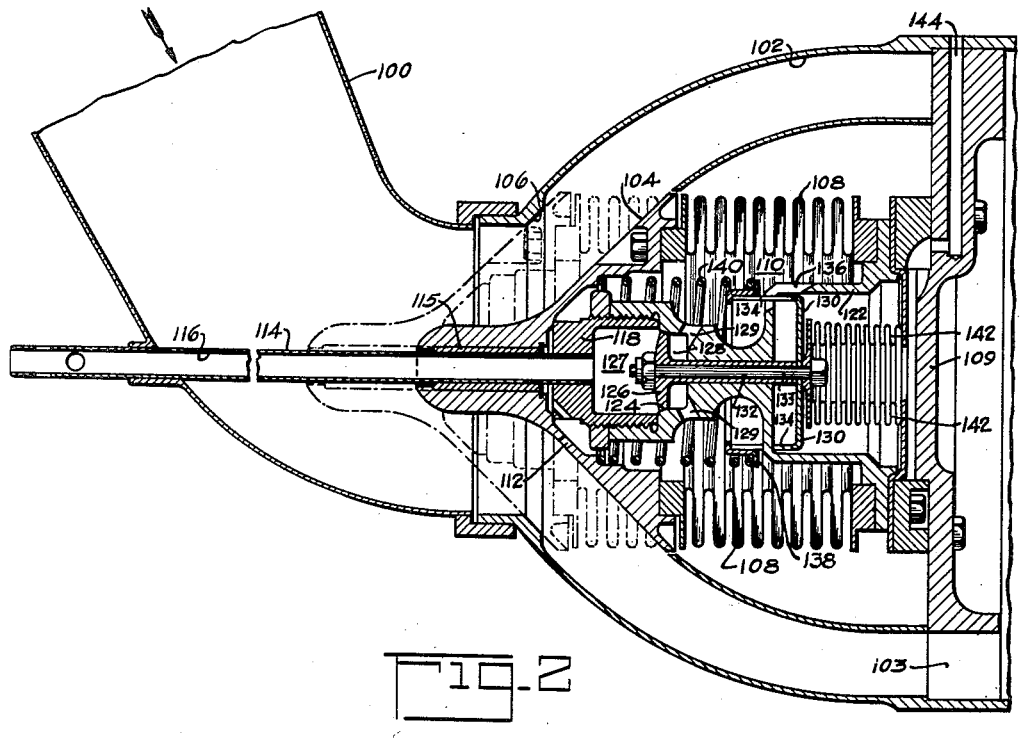
INVENTORS
HILLARD E. BARRETT.
CONSTANTINE S. CONSTANTINO.
BY
*Victor D. Behn*
ATTORNEY Patented Aug. 31, 1954

2,687,868

UNITED STATES PATENT OFFICE 2,687,868

FLOW CONTROL VALVE

Hillard E. Barrett, East Orange, and Constantine S. Constantino, Maywood, N. J., assignors to Curtiss-Wright Corporation, a corporation of Delaware Application May 31, 1950, Serial No. 165,206

7 Claims. (Cl. 251—28)

This invention relates to flow regulating apparatus and is particularly directed to such apparatus having a flow regulating valve whose position is automatically controlled.

An object of the present invention comprises the provision of novel flow regulating apparatus having a flow regulating valve whose position depends substantially only on the magnitude of a control force. A further object of the invention comprises the provision of novel flow regulating apparatus having a flow regulating valve whose position is independent of changes in the pressure of the fluid whose flow is being regulated. A still further object of the invention comprises the provision of novel flow regulating apparatus in which the position of the flow regulating valve is controlled by an auxiliary valve requiring relatively little force for its operation.

Other objects of the invention will become apparent upon reading the next detailed description in connection with the drawing in which;

Figure 1 is a sectional view illustrating one embodiment of the invention; and

Figure 2 is a sectional view illustrating another embodiment of the invention.

Referring first to Figure 1 of the drawing, a valve housing 10 has a passage 12 therethrough including an inlet port 14 and an outlet port 16. As schematically illustrated, a pump 18 supplies a fluid (which for example may be a liquid fuel) to the valve passage 12. A valve seat 20 is secured about said passage 12 between said ports and a poppet-type valve 22 is mounted in said passage for movement toward and away from said valve seat for controlling fluid flow through said passage. The valve 22 has a guide stem 24 coaxial therewith, said stem being slidably fitted within a collar 26 secured to the valve seat 20 by spokes 28. The valve 22 is connected to the housing 10 by a bellows-type flexible diaphragm 30. A compression spring 32 is disposed between the housing 10 and the valve 22 for urging said valve toward the valve seat 20. Obviously, however, the bellows 30 itself may provide a sufficient spring force urging the valve 22 in a closing direction in which case the spring 32 would be eliminated.

The bellows 30 forms a chamber 34 in the housing 10 out of communication with the passage 12 except through a restricted passage provided by hole 36 through the valve stem 24. The fluid entering the chamber 34 through the restricted passage 36 flows out of said chamber through a passage 38 under the control of an auxiliary valve 40 for controlling the position of the main valve 22. The passage 38 communicates with a suitable source of low pressure having a pressure less than the output pressure of the pump 18. As schematically illustrated, the passage 38 is connected to the inlet side of the pump 18. As will appear however, the passage 38 may vent the chamber 34 to any suitable low pressure source. The auxiliary valve 40 is movable toward and away from a valve seat 42 for controlling the escape of fluid from the chamber 34. The valve seat 42 has a sleeve portion 44 secured to the housing 10 and the auxiliary valve 40 has a plurality of projections 46 slidingly engaging said sleeve portion for guiding the valve 40. The valve 40 is threadedly secured to stem 48 and a plate 50 is secured to said stem and to the valve 40. A compression spring 52 is disposed in the chamber 34 between the plate 50 and the main valve 22 whereby the spring 52 urges both valves 22 and 40 in a closing direction and each of said valves provides the reaction to the force of the spring 52 against the other of said valves.

The valve stem 48 extends through a housing partition member 54 and a bellows-type flexible diaphragm 56 connects the adjacent end of the valve stem 48 to said partition member. The effective diameter of the bellows 56 is substantially the same as the effective diameter of the auxiliary valve 40 so that the pressure of the fluid on the discharge side of said auxiliary valve is balanced by the pressure of said fluid against the facing end of the valve stem 48 and the bellows 56. Said end of the valve stem 48 is also connected to the adjacent end of the housing 10 by a bellows-type flexible diaphragm 58 having the same effective diameter as that of the valve 40 and bellows 56. In addition the valve stem 48 has a bore 59 therethru whereby the force of the fluid pressure in the chamber 34 against the valve stem 48 and auxiliary valve 40 is balanced by the force of the same fluid pressure in the bellows 58 against the valve stem 48.

The valve stem 48 is also connected to the housing 10 by a bellows-type flexible diaphragm 60 larger than and surrounding the bellows 58. A fluid pressure fitting 62 is secured to and projects from the housing 10 for applying a control fluid pressure into the bellows 60 about the bellows 58 through a longitudinal passage 64 and radial passages 66. As illustrated, the fitting 62 is formed integral with the adjacent end of the bellows 58. The exterior of the bellows 60 is in communication with the surrounding atmosphere through one or more holes 68 in the housing 10. In general the absolute magnitude of a control pressure, such as supplied to the bellows 60, will vary with changes in the surrounding atmospheric pressure. In such case, since the exterior of the bellows 60 is in communication with the surrounding atmosphere the pressure differential across the bellows 60 will be independent of variations in the pressure of the surrounding atmosphere.

The rate of fluid flow through the restricted passage 36 is very small so that the range of movement of the auxiliary valve 40 between its full open and closed positions is very small or negligible compared to the range of movement of the main valve 22. Preferably, the auxiliary valve 40 has as large a diameter as practical in order to reduce its range of movement to a minimum.

With the aforedescribed structure, the fluid pressure in the chamber 34 is less than the fluid pressure on the upstream side of the main valve 22 by an amount equal to the fluid pressure drop through the restricted passage 36. This fluid pressure differential urges the main valve 22 in an opening direction against the force of the springs 32 and 52. Accordingly, the main valve 22 assumes a position in which the force of said springs is balanced by said pressure fluid differential. Similarly the auxiliary valve 40 automatically assumes a position in which the force of the spring 52 against said valve is balanced by the force of the fluid pressure within the bellows 60 against the stem 48 of said valve 40. If the control pressure fluid applied through the fitting 62 to the interior of the bellows 60 is increased, then the auxiliary valve 40 opens against the spring 52 to increase the rate of fluid flow through the restricted passage 36 thereby increasing the fluid pressure differential acting on the main valve 22. As a result, the main valve 22 moves in an opening direction. This movement of the main valve 22 increases the force exerted against the auxiliary valve 40 by the spring 52 and effects a closing adjustment of said auxiliary valve thereby reducing the fluid pressured differential acting on main valve 22. Thus, upon an increase in the control fluid pressure within the bellows 60 the fluid pressure differential across the main valve 22 is increased so that said main valve 22 moves in an opening direction until the force of the springs 32 and 52 against said main valve is again balanced by said fluid pressure differential. Similarly, a decrease in the control fluid pressure applied to the bellows 60 produces a closing adjustment of the main valve 22.

Because the spring 52 interconnects the main valve 22 with the auxiliary valve 40, movement of the main valve 22 is accompanied by a follow-up movement of the auxiliary valve 40 in a direction to help rebalance the forces acting on said main valve. In addition, because of the spring 52, the position of the main valve 22 is substantially independent of changes in the fluid pressure in the passage 12 and/or the fluid pressure to which the chamber 34 is vented through the passage 36 whereby the position of said main valve is a linear function of the magnitude of the control fluid pressure within the bellows 60. Thus the position of the main valve 22 alone controls the force of the spring 52 on the auxiliary valve 40 whereby for a given control pressure in the bellows 60 the position of the main valve necessarily is such that the force of the spring 52 against the auxiliary valve balances said control pressure. Accordingly, since the range of movement of the auxiliary valve 40 is negligible there is a predetermined fixed position of the main valve 22 for each magnitude of the control pressure within the bellows 60. For example if the fluid pressure upstream of the main valve 22 should decrease then there would be a decrease in the flow through the restricted passage 36 so that the main valve 22 would start to move in a closing direction thereby reducing the force of the spring 52 on the auxiliary valve 40. As a result, the auxiliary valve 40 would open thereby increasing the fluid flow through the restricted passage 36 until the fluid pressure differential across the main valve 22 became sufficient to move said main valve to its original position in which the force of the spring 52 on the auxiliary valve 40 again balances the control pressure in the bellows 60.

The spring 32 acts only against the main valve 22 while the spring 52 acts against both valves 22 and 40 whereby the fluid pressure force required to move the auxiliary valve 40 only needs to overcome the force of the spring 52 whereby the fluid pressure force required to open said auxiliary valve is small compared to the fluid pressure force required to open the main valve 22.

Figure 2 illustrates modified construction of the invention. The modification illustrated in Figure 2 has been designed for controlling air flow to an air turbine. This general combination is similar to that illustrated in copending application Serial No. 57,144 filed October 29th, 1948 in the name of Barrett et al., and now abandoned.

In Figure 2, air under pressure is supplied through a duct 100 for flow through an annular passage 102 from which it is directed by guide vanes 103 to the rotor blades of an air turbine (not shown). The valve 104 is movable toward and away from a valve seat 106 for controlling air flow from the duct 100 to the annular passage 102. In Figure 2, the full lines illustrate the valve 104 in its full open position and the dot and dash lines illustrate said valve in its closed position.

The duct 100 and annular passage 102 form a housing for the valve 104 and its control mechanism. A bellows-type flexible diaphragm 108 is connected at one end to the periphery of the valve 104 and at its other end to a housing member 109. The flexible bellows 108 provides a spring force urging the valve 104 in a closing direction. As in Figure 1, in addition to or in lieu of any spring force provided by the bellows 108, a separate compression spring may be provided between the housing member 109 and the valve 104 urging the valve in a closing direction. The bellows 108 also provides a chamber 110 on the rear side of the valve 104 and said valve is provided with a restricted passage 112 providing for air flow into the chamber 110 from the duct 100.

The valve 104 constitutes the main valve for controlling air flow through the duct 100 into the annular passage 102. The main valve 104 is slidable on a hollow rod 114, a bushing 115 being provided between said valve and the rod 114. The rod 114 has a longitudinal passage 116 therethrough and one end of said rod projects through a wall of the duct 100 into the surrounding atmosphere. The other end 118 of the rod 114 is enlarged and said enlarged end is threadedly secured to a member 122 which in turn is secured to the housing member 109. An annular valve seat 124 is formed on the end of the member 122 adjacent to the enlarged end 118 of the member 114. An auxiliary valve 126 is slidably supported by the member 122, said valve having a head portion cooperable with said seat 124 for controlling communication between the chambers 127 and 128 formed respectively within the enlarged end 118 of the rod 114 and within the adjacent portion of the member 122. The member 122 is also provided with one or more openings 129 whereby the auxiliary valve 126 is movable to control the rate at which air bleeds from the chamber 110 through the openings 129, chambers 123, 127 and the hollow rod 114 and thence into the surrounding atmosphere.

A plate 130 is secured to the end of the stem 132 of the auxiliary valve 126 by means of a bolt 133, said plate having circumferentially spaced fingers 134 extending through slots 136 in the member 122. A collar 138 is secured to the fingers 134 and a compression spring 140 is interposed between said collar and the main valve 104. The spring 140 urges both the main valve 104 and the auxiliary valve 126 in a closing direction, each said valve providing the reaction to the force exerted by the spring 140 against the other of said valves.

A bellows-type flexible diaphragm 142 is secured to the end of the valve stem 132 and to the housing member 103, said bellows having substantially the same effective diameter as that of the auxiliary valve 126 whereby said auxiliary valve is balanced as far as the fluid pressure in the chamber 110 is concerned. A controlled above-atmospheric pressure is applied to the interior of the bellows 142 through a passage 144 for urging the auxiliary valve 126 in an opening direction against the spring 140.

The operation of Figure 2 is essentially the same as that of Figure 1. In Figure 2, the chamber 110 behind the main valve 104 is vented to the surrounding atmosphere instead of to some other pressure as in Figure 1. Thus in Figure 1 the chamber 34 behind the main valve 22 is vented to the inlet of the pump 10 instead of to the surrounding atmosphere. Furthermore, in Figure 2 since the control pressure applied to the bellows 142 and thence to the auxiliary valve 126 has a predetermined above-atmospheric magnitude, there is no need in Figure 2 to balance said auxiliary valve against changes in the atmospheric vent pressure. Accordingly, there is no equivalent in Figure 2 of the bellows 56 of Figure 1.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. Apparatus for controlling the flow of a fluid through a passage; said apparatus comprising a valve member movable to vary said flow; a second member movable to vary a force urging said valve member in an opening direction; elastic means for exerting a force against said valve member in a closing direction and for exerting a force against said second member in a direction for decreasing said first mentioned force, each said member providing the reaction to at least a portion of the force exerted by said elastic means against the other of said members; and means for applying a gas pressure against said second member in opposition to said elastic means such that said second member automatically moves to a position in which the force of said gas pressure thereon automatically balances the elastic means force thereon whereby variations in said gas pressure are effective to control the position of said valve member.

2. Apparatus for controlling the flow of a fluid through a passage; said apparatus comprising a first valve member movable in said passage to vary said flow; a second valve member movable in an opening direction to increase a fluid pressure differential acting against and urging said first valve member in an opening direction; elastic means for exerting a force against both said valve members in a closing direction, each valve member providing the reaction to at least a portion of the force exerted by said elastic means against the other valve member; and means for applying a gas pressure against said second valve member urging said second valve member in an opening direction such that said second valve member automatically moves to a position in which the force of said gas pressure thereon balances the elastic means force thereon whereby an increase in said gas pressure is effective to cause an opening adjustment of said first valve member.

3. Apparatus for controlling the flow of a fluid; said apparatus comprising a housing having a passage therethrough for said fluid; means including a first valve member movable in said passage for controlling fluid flow therethrough, said means providing a chamber within said housing such that the fluid pressure within said chamber urges said valve member in a closing direction against the pressure of fluid in said passage; a restricted passageway providing communication between said passage and said chamber for fluid flow from said passage into said chamber; a second valve member movable to control the escape of fluid from said chamber; elastic means for exerting valve closing forces against both said valve members, each said valve member providing the reaction to at least a portion of the force exerted by said elastic means against the other of said valve members; and means for applying a gas pressure force to said second valve member for urging said second valve member in an opening direction against said elastic means so that said second valve member automatically moves to a position in which said gas pressure force thereon balances the elastic means force on said second valve member.

4. Apparatus for controlling the flow of a fluid through a passage; said apparatus comprising a first valve member movable in said passage to vary said flow; a second valve member movable to vary a fluid pressure differential acting against and urging said first valve member in an opening direction; elastic means for exerting a force against said first valve member in a closing direction and exerting a force against said second valve member in a direction for decreasing said pressure differential, each valve member providing the reaction to at least a portion of the force exerted by said elastic means against the other valve member; a flexible diaphragm connected to said second valve member; and passage means for supplying a gas pressure to one side of said diaphragm for opposing the force exerted by said elastic means against said second valve member so that said second valve member automatically moves to a position in which said gas pressure force thereon balances the elastic means force thereon.

5. Apparatus for controlling the flow of a fluid; said apparatus comprising a housing having a passage therethrough for said fluid, a first valve member movable in said passage to vary said flow; a flexible bellows having one end connected to said housing and having its other end connected to said valve member to provide a chamber within said housing such that the fluid pressure in said chamber urges said valve member in a closing direction against the pressure of said fluid in said passage; a restricted passageway providing communication between said passage and chamber for flow of said fluid through said restricted passageway into said chamber such that the fluid pressure drop across said restricted passageway provides a force urging said valve member in an opening direction; a second valve member movable in an opening direction to increase the rate of fluid flow through said restricted passageway into said chamber thereby increasing said pressure drop and force; elastic means for exerting valve closing forces against both said valve members, each said valve member providing the reaction to at least a portion of the force exerted by said elastic means against the other valve member; a flexible diaphragm connected to said second valve member; and passage means for supplying a gas pressure to one side of said diaphragm for urging said second valve member against said spring means so that said second valve member automatically moves to a position in which the gas pressure force and elastic means force acting thereon balance.

6. Apparatus for controlling the flow of a fluid; said apparatus comprising a housing having a passage therethrough for said fluid; a poppet-type first valve member movable in said passage to vary said flow; a flexible bellows having a diameter substantially equal to that of said valve member and having one end connected to the rear side of said valve member to provide a chamber on said rear side such that the fluid pressure in said chamber urges said valve in a closing direction against the pressure of said fluid in said passage; a restricted passageway providing communication between said passage and chamber for flow of said fluid through said restricted passageway into said chamber such that the fluid pressure drop across said restricted passageway provides a force urging said valve member in an opening direction; a second valve member movable in an opening direction to increase the rate of fluid flow through said restricted passageway into said chamber thereby increasing said pressure drop and force; spring means for exerting valve closing forces against both said valve members, each said valve member providing the reaction to at least a portion of the force exerted by said elastic means against the other valve member; a flexible diaphragm connected to said second valve member; and passage means for supplying a gas pressure to one side of said diaphragm for urging said second valve member against said spring means so that said second valve member automatically moves to a position in which the gas pressure force and elastic means force acting thereon balance.

7. Apparatus for controlling the flow of a fluid through a passage; said apparatus comprising a first valve member movable in said passage and arranged to be subject to a fluid pressure differential acting against and urging said valve member in an opening direction in response to flow of said fluid through said passage; a second valve member movable to vary said fluid pressure differential acting against said first valve member; elastic means for exerting a force against said first valve member in a closing direction and exerting a force against said second valve member in a direction for decreasing said pressure differential, each valve member providing the reaction to at least a portion of the force exerted by said elastic means against the other valve member; a flexible diaphragm connected to said second valve member; and passage means for supplying a gas pressure to one side of said diaphragm for opposing the force exerted by said elastic means against said second valve member so that said second valve member automatically moves to a position in which said gas pressure force thereon balances the elastic means force thereon.

References Cited in the file of this patent

UNITED STATES PATENTS

| Number | Name | Date |
|---|---|---|
| 226,224 | Demarest | Apr. 6, 1880 |
| 2,191,076 | Jacovelli | Feb. 20, 1940 |
| 2,227,258 | Hilmer et al. | Dec. 31, 1940 |
| 2,304,323 | Wiegers | Dec. 8, 1942 |